March 26, 1963  J. R. HOLLOWELL  3,083,034
WHEEL SUSPENSION WITH RIDE CONTROL
Filed Nov. 10, 1960  3 Sheets-Sheet 1

JOHN R. HOLLOWELL
INVENTOR.

BY John R. Faulkner
John J. Roethel
ATTORNEYS

JOHN R. HOLLOWELL
*INVENTOR.*

March 26, 1963   J. R. HOLLOWELL   3,083,034
WHEEL SUSPENSION WITH RIDE CONTROL
Filed Nov. 10, 1960   3 Sheets-Sheet 3

JOHN R. HOLLOWELL
INVENTOR.

BY John C. Faulkner
John J. Roethel
ATTORNEYS

United States Patent Office 3,083,034
Patented Mar. 26, 1963

3,083,034
WHEEL SUSPENSION WITH RIDE CONTROL
John R. Hollowell, Brightwaters, N.Y., assignor to Ford Motor Company, Dearborn, Mich., a corporation of Delaware
Filed Nov. 10, 1960, Ser. No. 68,468
7 Claims. (Cl. 280—124)

This invention relates to motor vehicles and more particularly to a wheel suspension for such vehicles.

Structures have been proposed which act on conventional vehicle springs to change the ride level of the vehicle to compensate for varying vehicle loads. These systems, in some way, return the ride level of the vehicle to its normal position when excessive loads are encountered. It is, of course, desirable to maintain normal ground clearance when the vehicle is heavily loaded. Such systems, however, generally fail to provide any way in which the spring rate may be changed to compensate for these excessive loadings so that optimum ride characteristics can be obtained under varying conditions. Since the conventional spring rate is generally too low to accommodate the additional load occasionally encountered, excessive spring deflection and oscillation of the loaded vehicle results with accompanying discomfort to the passengers.

This invention provides a simple but effective mechanism which can easily be adapted to conventional vehicles and yet adjusts both the ride level and the effective spring rate concurrently to provide uniform ride conditions under varying loads. These results are obtained by providing a member which contacts the conventional leaf spring causing the spring to deflect about the point of contact when loads are encountered. The member is pivoted at one of its ends about an axis fixed in relation to the vehicle frame. As this member pivots the point of contact between the member and the spring is changed thus varying the effective length and, accordingly, the rate of the spring. This pivotal movement also simultaneously adjusts the ride level by changing the distance between the spring and the frame.

Further objects and advantages of this invention will become more apparent as this description proceeds, particularly when considered in connection with the accompanying drawings in which.

Figure 1:
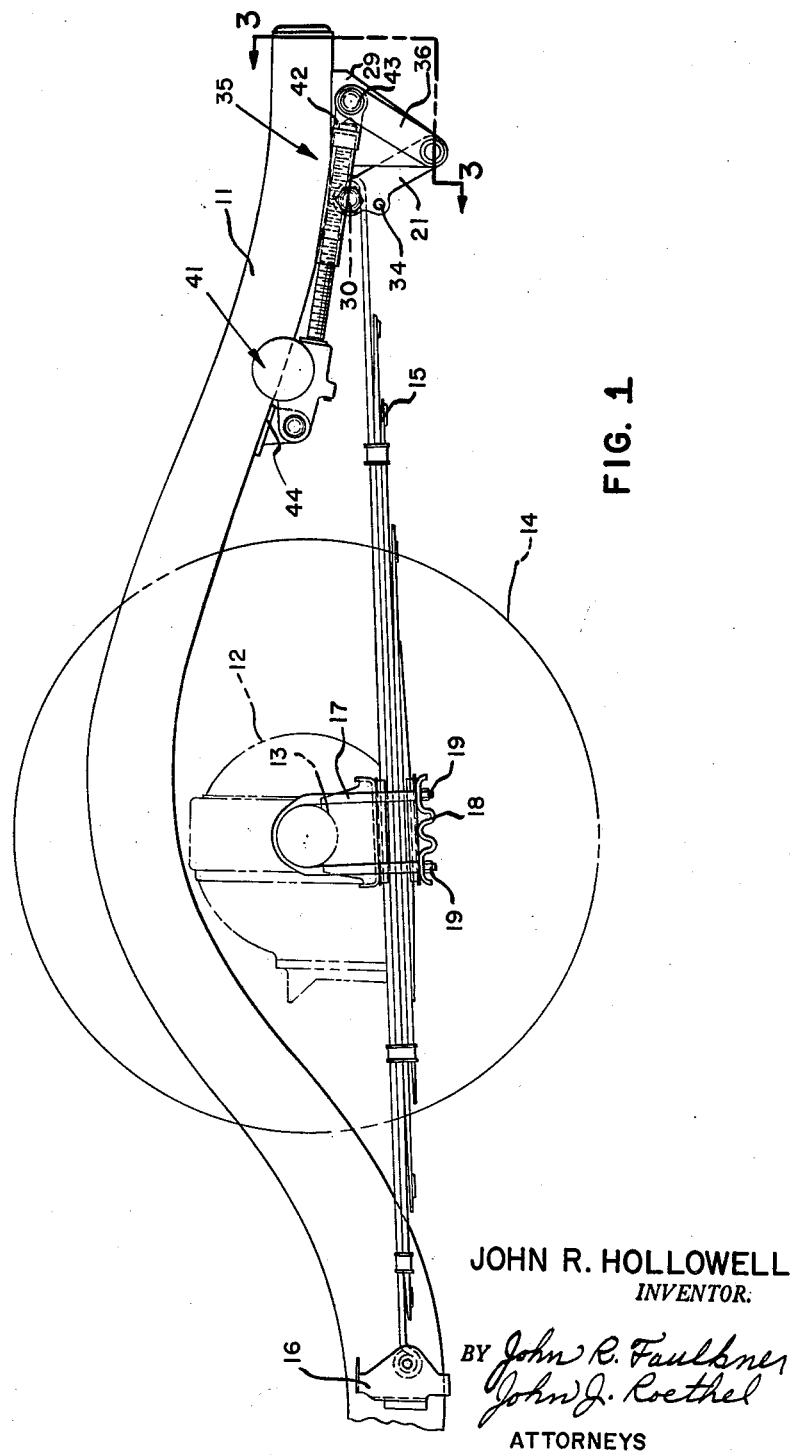
FIGURE 1 is a partial side elevational view of a motor vehicle incorporating this invention.

Referring now to the drawings, there is shown at 11 the side rail of the rear portion of a motor vehicle frame. The rear portion of the vehicle drive line, which includes differential housing 12, axle shaft housing 13 and wheel 14, is shown in phantom. A semi-elliptic leaf spring 15 is connected to the frame side rail 11 at its forward end by a front spring hanger 16 in the known manner. The axle housing 13 is connected to the spring 15 intermediate the ends thereof by spring clips 17, clip plate 18 and clip nuts 19. The structure thus far described is conventional in motor vehicle rear suspension systems.

Figure 3:
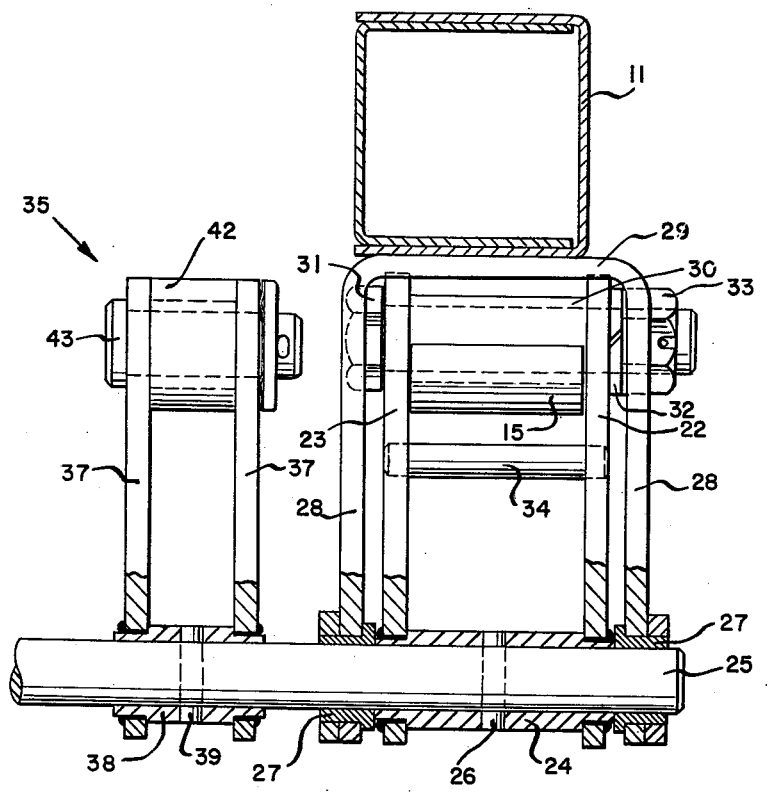

In this invention, the conventional rear shackle, which normally connects the back end of the spring to the frame side rail, is replaced by a lever 21. This lever consists of two arms 22 and 23 which are welded or otherwise secured to tubular member 24, best shown in FIGURE 3. A rod 25 extends through tubular member 24 and is secured thereto by pin 26. Rod 25 and, in turn, lever 21 are supported for pivotal movement by bushings 27, preferably formed of nylon, contained in the downward extending arms 28 of bracket 29. Bracket 29 is welded or otherwise suitably secured to the side rail 11. A roller 30, preferably formed of nylon, is carried between the arms 22 and 23 of lever 21 by bolt 31. This bolt is secured in place by lock washer 32 and nut 33. Leaf spring 15 passes between arms 22 and 23 of lever 21 and is contacted by roller 30. The weight of the vehicle maintains the contact between roller 30 and spring 15. The rear portion of the side rail 11 is thus supported by springs 15 via roller 30, lever 21, rod 25 and bracket 29. A pin 34 is secured to lever 21 to limit the rebound travel of spring 15.

The point of contact between the roller 30 and spring 15 and the distance between frame 11 and spring 15 may be changed concurrently by causing the lever 21 and rod 25 to pivot about bushings 27. The mechanism which performs this function is shown generally at 35 and includes a lever 36 formed of arms 37 welded or otherwise secured to the tubular member 38. This member is secured to rod 25, as by pin 39. Movement of the lever 36 is controlled by the motor actuated screw jack assembly 41. Such devices are well known in the art. The output member 42 of screw jack 41 is pivotally connected to the upstanding arms 37 of lever 36 by pin 43. The jack assembly 41 is pivotally connected to the underside of the frame kickup by bracket 44 which bracket is welded or otherwise secured to the frame.

Rod 25 may extend across the width of the vehicle to a lever mechanism similar to lever 21 acting on the spring at the other side of the vehicle. Thus the ride level of the springs located at each side of the frame may be controlled by a single motor. If desired a separate leveling mechanism of the type shown may be provided at each side of the vehicle and each assembly may be operated independently of the other by any suitable mechanism.

Operation

Figure 2:
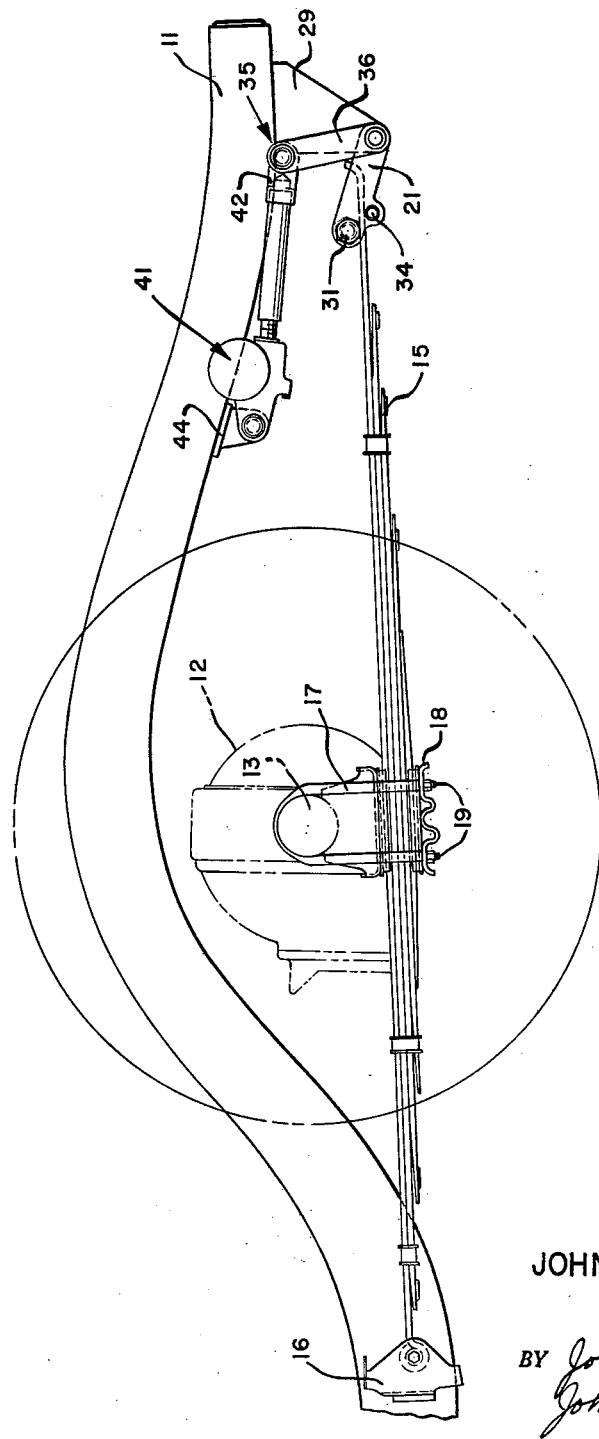
FIGURE 2 is a view similar to FIGURE 1 showing the mechanism in another position; and, FIGURE 3 is a cross sectional view taken along line 3—3 of FIGURE 1.

FIGURE 1 shows the vehicle as it appears in the unloaded condition. As the vehicle is loaded spring 15 deflects with a corresponding decrease in body level. To compensate for this decrease in ground clearance jack screw assembly 41 may be actuated, either selectively under the operator's control by any suitable switching mechanism or by any of the automatic level controls known in the art. Actuation of the screw jack causes it to shorten, pivoting lever 36 and rod 25 about busings 27 in a counterclockwise direction. This movement of rod 25 causes lever 21 connected thereto also to pivot about bushings 27. As may be seen in FIGURE 2, the pivotal movement of lever 21 causes the frame to be lifted away from the axle housing 13 and the ground. Conjoint with this movement the point of contact between roller 30 and spring 15 is shifted longitudinally. As may be seen, when the vehicle body is raised to compensate for the additional loading the point of contact between roller 30 and spring 15 moves closer to the place of connection between the springs 15 and axle housing 13.

Since the spring 15 deflects about the point at which it contacts roller 30 the distance between this point and the place of connection with the axle housing determines the effective length of the spring. The amount of deflection of a leaf spring under load depends upon its length and may be expressed by the following equation:

$$\delta = KPL^3$$

Where:
 $\delta$ = deflection
 $K$ = a constant
 $P$ = force applied to the end of the spring
 $L$ = length of spring Thus any change in the effective length of a leaf spring will change its spring rate. As will be seen from the above formula, a decrease in the spring length will have the effect of increasing the spring rate and decrease deflection under a given load. Since the spring rate changes as the cube of the length of the spring, a small change in length will reduce a marked change in the spring rate. In one embodiment it was found that a 2 inch decrease in the length of a spring having a normal 30 inch length produced over an 18 percent increase in spring rate.

It can thus be seen that a device is provided which not only changes the ride level of motor vehicles, but also simultaneously adjusts the spring rate to provide optimum ride characteristics under varying loading conditions.

It is to be understood that the term "frame" when used in the description and claims is not to be taken as limiting this invention solely to conventional motor vehicles utilizing separate frames. "Frame" is used in the generic sense and may refer to either conventional or unit constructed vehicles since this invention is, obviously, capable of use with any motor vehicles regardless of the "frame" construction utilized.

It will be further understood that the invention is not to be limited to the exact construction shown and described, but that various changes and modifications may be made without departing from the spirit and scope of the invention, as defined in the appended claims:

I claim:

1. In a suspension system for motor vehicles having a sprung member and an unsprung member, spring means operatively connected to said sprung member and said unsprung member, a member contacting said spring fixing the distance between said sprung and unsprung members, said member being supported for pivotal movement about an axis fixed with relation to one of said sprung and unsprung members to thereby change the location at which said member contacts said spring and the distance between said sprung and unsprung members, and means operative to cause said member to pivot about its axis and thereby simultaneously increase the ride level and effective spring rate of said spring.

2. In a wheel suspension for motor vehicles having a wheel support and a frame, spring means operatively connected to said support and said frame, a member contacting said spring fixing the distance between said wheel support and said frame, said member being supported for pivotal movement about an axis fixed with relation to said frame to thereby change the location at which said member contacts said spring and the distance between said wheel support and said frame, and means operative to cause said member to pivot about its axis and thereby simultaneously increase the ride level and effective spring rate of said spring.

3. In a wheel suspension for motor vehicles having a frame and wheel supporting means, a spring having one of its ends operatively connected to said frame, said spring being operatively connected to said wheel supporting means at a position spaced from said one end, a member contacting said spring at a position spaced from said one end and the position of operative connection of said spring and said wheel supporting means fixing the distance between said frame and said wheel supporting means, said member being so constructed and arranged to cause said spring to deflect about its position of contact with said member upon the application of loads to said frame and said wheel, means supporting said member for movement about a pivotal axis fixed in relation to said frame thereby changing the location of the position of contact between said member and said spring and the distance between said frame and said wheel supporting means, and power operated means effective to cause said member to pivot about its axis whereby the ride level and effective rate of said spring are increased simultaneously.

4. In a wheel suspension for motor vehicles having a frame and wheel supporting means, a leaf spring having one of its ends operatively connected to said frame, said leaf spring being operatively connected to said wheel supporting means at a position spaced from said one end, a member contacting said leaf spring at a position spaced from said one end and the position of operative connection of said leaf spring and said wheel supporting means to fix the distance between said frame and said wheel supporting means, said member being so constructed and arranged to cause said leaf spring to deflect about its position of contact with said member upon the application of loads to said frame and said wheel, means supporting said member for movement about a pivotal axis fixed in relation to said frame thereby changing the location of the position of contact between said member and leaf spring and the distance between said frame and said wheel supporting means, and power operated means effective to cause said member to pivot about its axis whereby the ride level and effective rate of said leaf spring are increased simultaneously.

5. In a wheel suspension for motor vehicles, a vehicle frame, a wheel supporting means, a leaf spring having one of its ends operatively connected to said frame, means operatively connecting said wheel supporting member and said leaf spring intermediate the ends thereof, a member contacting said leaf spring contiguous to the other end thereof fixing the distance between said frame and said wheel supporting means and causing said spring to deflect thereabout upon the application of loads to said wheel supporting means and said frame, means supporting said member for pivotal movement about a pivotal axis fixed in relation to said frame thereby changing the position of contact of said member and said spring and the distance between said frame and said wheel supporting means, and power operative means effective to cause said member to pivot about its axis whereby the ride level and effective rate of said spring are increased simultaneously.

6. In a wheel suspension for motor vehicles, a vehicle frame, a wheel supporting means, a leaf spring operatively connected at one end thereof to said frame, means operatively connecting said wheel supporting means and said spring mediate the ends thereof, a lever pivotally connected to said frame, a member on the end of said lever contacting said spring contiguous to the other end thereof fixing the distance between said frame and said wheel supporting means and causing said spring to deflect thereabout upon the application of loads to said wheel supporting means and said frame, and power operated means operatively connected to said lever effective to cause said lever to pivot about its axis and thereby increase the ride level and effective rate of said spring simultaneously.

7. In a wheel suspension for wheel vehicles having a frame and a wheel supporting means, a leaf spring operatively connected at one end thereof to said frame, means operatively connecting said wheel supporting means and said spring intermediate the ends thereof, bracket means secured to said frame and extending downwardly therefrom near the other end of said spring, first lever means pivotally supported at one end thereof by said bracket means, the point of pivotal connection between said bracket means and said first lever means being below said other end of said spring, a member secured to the other end of said first lever means, said member contacting the upper surface of said spring contiguous to said other end and causing said spring to deflect thereabout, second lever means pivotally supported by said bracket and operatively connected to said first lever means whereby pivotal movement of the former results in pivotal movement of the latter, and power operated screw jack means operatively connected to said second lever means operative to cause said levers to pivot whereby the point of contact between said member and said spring simultaneously moves longitudinally relative to said spring and vertically relative to said frame.

References Cited in the file of this patent
UNITED STATES PATENTS

| | | |
|---|---|---|
| 1,200,194 | Houdaille | Oct. 3, 1916 |
| 2,224,717 | Austin | Dec. 10, 1940 |

FOREIGN PATENTS

| | | |
|---|---|---|
| 28,396 of 1912 | Great Britain | Nov. 27, 1913 |